United States Patent [19]

Sahlgren et al.

[11] E Patent Number: Re. 33,437

[45] Reissued Date of Patent: Nov. 13, 1990

[54] ROLLER BEARING CAGE

[75] Inventors: Anders Sahlgren, Molndal; Rolf Gustafsson, Hindas; Bo Goransson, Gothenburg; Yngve Sundqvist, Partille, all of Sweden

[73] Assignee: Aktiebolaget SKF, Goteborg, Sweden

[21] Appl. No.: 292,996

[22] Filed: Jan. 3, 1989

Related U.S. Patent Documents

Reissue of:

[64] Patent No.: 4,684,268
Issued: Aug. 4, 1987
Appl. No.: 917,200
Filed: Oct. 9, 1986

[30] Foreign Application Priority Data

Dec. 10, 1985 [SE] Sweden ..... 8505822

[51] Int. Cl.[5] ..... F16C 33/54
[52] U.S. Cl. ..... 384/574; 384/572
[58] Field of Search ..... 384/574, 572, 575, 578, 384/571, 577

[56] References Cited

U.S. PATENT DOCUMENTS

| | | | |
|---|---|---|---|
| 1,914,548 | 6/1933 | Wingquist | 384/571 |
| 1,982,896 | 12/1934 | Ackerman | 384/574 |
| 2,096,321 | 10/1937 | Cox | 384/574 |
| 2,218,985 | 10/1940 | Gibbons | 384/572 |
| 2,375,145 | 5/1945 | Styri | 384/577 |
| 3,644,006 | 2/1972 | Feuillat | 384/574 |

*Primary Examiner*—Lenard A. Footland
*Attorney, Agent, or Firm*—Eugene E. Renz

[57] ABSTRACT

A cage for the rollers in a roller bearing in which the roller axes (2) define an angle with the bearing axis (3) has two annular portions (4, 5) and intermediate cage bars (6) defining cage pockets (7). The bars are situated radially inside of the roller axes with respect to the bearing and a flange (8) for guiding the roller by contacting their ends is extending radially outwards from one of the annular portions (4). A protrusion (9) is arranged on the flange (8) in connection to each pocket (7) or insertion into a recess in the adjacent roller end and thereby keeping the roller in the cage pocket. A recess (10) in the other annular portion (5) opposite each protrusion (9) simplifies the snapping of the roller into its pocket in the cage.

8 Claims, 1 Drawing Sheet

ROLLER BEARING CAGE

Matter enclosed in heavy brackets [ ] appears in the original patent but forms no part of this reissue specification; matter printed in italics indicates the additions made by reissue.

The invention relates to a roller bearing cage of the kind defined in the introductory clause of claim 1.

A roller cage of pressed sheet metal having stamped roller pockets for use in spherical roller bearings is known by e.g. U.S. Pat. No. 2,218,985. Roller guidance and cage centering take place in such a cage by the rollers contacting the cut rims of the roller pockets. This contact is unsuitable, since the contact surfaces are comparatively small, which gives a high contact pressure and poor lubrication conditions and may cause excessive wear.

U.S. Pat. No. 2,375,145 shows that roller guidance can be effected by a cage having a flange with a portion contacting an end surface of a roller mounted in the cage. The general structure of such a cage entails certain disadvantages, however. The radially inwardly directed flange occupies the limited space between two adjacent rows of rollers, which requires a wider bearing or shorter rollers than necessary. The cage pockets are open at one side, which means, despite the fact that there is a guiding flange, that the roller guidance is inferior to the roller guidance in a bearing having a cage with closed roller pockets. The cage and the rollers must be mounted on the inner ring of the bearing by pressing the rollers radially into the respective pockets because the inner ring is provided with flanges. The axial protrusions of the cage are pressed apart by the contact with the envelope surfaces of the rollers during mounting. These surfaces are sensitive to defects, since they take up the load in the bearing and roll against raceways in the outer and the inner rings. The surfaces can easily be damaged during mounting by the contact with the protrusions, which are comparatively hard and rigid.

The object of the present invention is to provide a cage which gives a good roller guidance, requires a small space in the axial direction of the bearing and permits careful and safe mounting of the rollers in the cage. This is obtained in a cage of the kind mentioned above by giving it the characterizing features stated in claim 1.

Such a cage can be produced by pressing and stamping of sheet metal blanks, and a bearing comprising such a cage can be quickly and easily assembled. The cage can be centered in the bearing by its contact with the rollers and does not have to be equipped with parts which contact a bearing ring.

The invention is described in detail in the following with reference to the accompanying drawing, in which.

Figure 1:
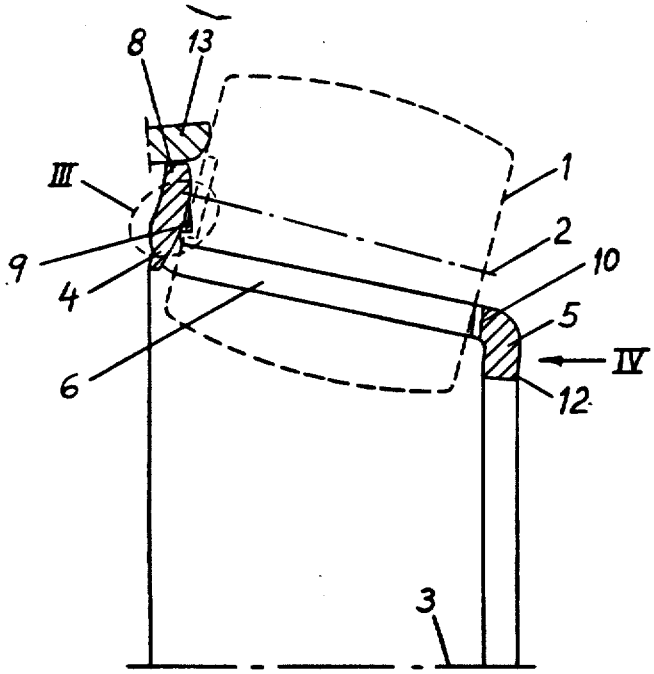
FIG. 1 shows an axial section of a portion of a cage according to one embodiment of the invention.
Figure 3:
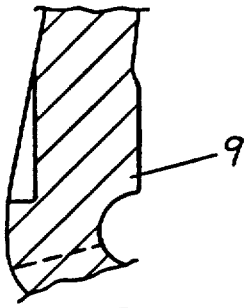
FIG. 3 shows a portion of the cage according to reference III in FIG. 1.
Figure 2:
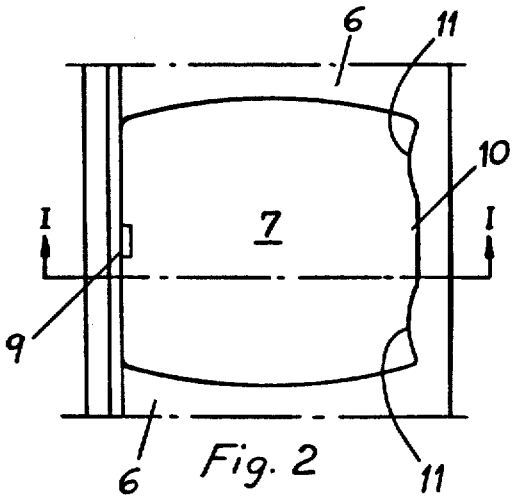
FIG. 2 shows a view from the outside and radially inward of a portion of the outer circumference of the cage, wherein section I—I corresponding to FIG. 1 is indicated.
Figure 4:
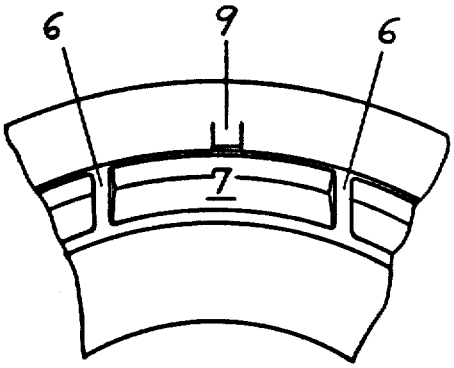
FIG. 4 shows an end view of a portion of the cage according to reference IV in FIG. 1.

The cage here described is suitable for use in a double row spherical roller bearing. In the section of FIG. 1, a roller 1 for such a bearing is outlined and placed in its proper position in the cage. The axis 2 of the roller forms an angle with the central axis 3 of the cage, whereby the axes or the rollers mounted in the cage define a cone with its apex on the axis 3, which coincides with the axis of the bearing. The cage comprises two closed annular portions 4, 5 and a number of bars 6 which extend between the portions 4, 5 and define roller pockets 7. The bars 6 extend mainly parallel to the axes 2 of adjacent rollers and are situated between the axis 3 of the cage and the axes 2 of the rollers. Thereby the bars occupy a minimum of space between the rollers, and the contact against the envelope surfaces of the rollers has a great radial force component with respect to the cage, so that the cage is firmly centered in the bearing by its contact with the rollers.

A flange 8 is arranged at one end of the cage in connection to one of the annular portions 4 and extend outwardly from the center of the cage. Thereby it does not significantly limit the space between the rows of the rollers in a double row spherical roller bearing. The side surface of the flange which is facing the pockets 7 contacts the rollers mounted in the cage on their end surfaces facing the flange. The flange suitably extends as far radially outwards that the extension of the roller axis 2 intersects the flange surface which contacts the rollers, whereby maximum roller guiding ability is achieved.

Since the cage bars 6 are situated radially inside the roller axes 2 with respect to the cage axis 3 and thereby do not limit the radially outward mobility of the rollers, the cage is provided with an arrangement for keeping the rollers in the cage also when they are not enclosed in an outer ring. This arrangement comprises protrusions 9 provided on the flange 8 and extending towards the roller pockets and having a surface which, in the direction towards the bearing axis, successively increases its distance from the flange surface. Each protrusion is situated so as to face the middle of each pocket. The protrusion is intended for insertion in a recess in the end surface of a roller situated in the opposing pocket, whereby the wedge shape of the protrusion allows the roller to be snapped into position in the pocket by pressing the end surface of the roller radially inwards past the protrusion 9.

This procedure is possible because of the resiliency of the cage. In order to ensure that the roller takes the correct position in relation to the pocket and the protrusion 9 during the snap action, recesses 10 are provided at the opposite side of the cage in relation to the flange 8 in the annular portion 5. The recesses oppose the protrusions 9. Therewith the end portion of each roller can be directed correctly with respect to the protrusion 9 by being placed in the recess. The existence of the recess also allows the roller to be axially displaced from the protrusion 9 in the initial stage of the snapping procedure, which simplifies mounting. The envelope surfaces of the rollers are not subjected to any pressure during the mounting procedure, which diminishes the risk for roller damages. A convex edge 11 is suitably provided on either side of each recess 10, which edge extends towards the interior of the pocket. This arrangement prevents the edges of the roller from contacting the cage when the rollers are tilted, thereby diminishing wear in the bearing.

Also the flange 8 has suitably a convex surface facing the rollers. The surface has the shape of a torus in order to give a suitable contact against the adjacent roller ends. A flange 12 is preferably arranged also in connection to the annular portion 5. Such a flange gives the cage an increased stability and strength. If the flange extends inwardly, the whole cage may be formed in a simple manner in a pressing and punching tool.

The cage in a double row spherical roller bearing is preferably supplemented with a loose guide ring 13 (FIG. 1) which encloses the flange 8 of the cages of both rows of rollers. FIG. 1 shows the cage of one row of rollers only. The guide ring co-operates with the cages in guiding the rollers.

If a roller in the loaded zone in the bearing has a tendency to skew it will be guided by the contact with the guide ring. At the same time, the guide ring will be displaced toward the loaded zone of the bearing by being squeezed into a wedge shaped space between the ends of the rollers of both rows of rollers. Therewith the guide ring displaces the cage radially towards the loaded zone of the bearing due to its contact with the cage in the unloaded zone so that the play of the rollers in the cage pockets in the loaded zone decreases, whereby the guidance of the rollers is further improved.

In high speed bearings, where roller guidance is particularly difficult, the centrifugal force acting on the unloaded rollers will press the rollers of the respective rows towards each other, thereby displacing the guide ring in the direction of the unloaded zone, whereby the axial play between the roller ends and the guide ring in the loaded zone decreases. This improves the roller guidance both in the loaded and in the unloaded zone, which is important in high speeds.

The position of the guide ring on the cage thus makes the guide ring cooperate with the cage in a manner which decreases the possibility of the roller to skew during operation.

What is claimed is:

1. A cage for a row of rollers (1) in a roller bearing in which the axes (2) of the rollers define a cone, which cage comprises two closed annular portions (4, 5) and a number of bars (6) extending between said portions, the bars defining roller pockets (7), characterized in that the cage bars (6) extend substantially parallel to the axes of adjacent rollers and are situated between the bearing axis (3) and the roller axes (2), that a flange (8) is provided at one end of the cage in connection to one of said annular portions (4) and extending radially outwards, the flange having a side surface intended for contacting the adjacent end surfaces of the rollers situated in the cage, that a number of protrusions (9) extending towards the pockets of the cage and having surfaces facing the pockets and successively increasing their distance from the flange surface in the direction towards the bearing axis are arranged on the flange (8) so as to face the middle of each pocket (7), respectively, and that the other one of said annular portions (5) is provided with a number of recesses (10) situated opposite the respective protrusions (9).

2. A roller cage according to claim 1, in which the flange surface facing the roller pockets is convex and torus shaped.

3. A roller cage according to claim 1, in which a convex edge (11) directed towards the pocket is arranged on either side of each recess in said other annular portion (5).

4. A roller cage according to claim 1, in which said other annular portion (5) is provided with an annular flange (12) extending towards the bearing axis.

5. A roller cage according to claim 1, in which the flange (8) is enclosed by a loose guide ring.

*6. A cage for a row of rollers (1) in a roller bearing in which the axes (2) of the rollers define a cone, which cage comprises two closed annular portions (4, 5) and a number of bars (6) extending between said portions, the bars defining roller pockets (7), characterized in that the cage bars (6) extend substantially parallel to the axes of adjacent rollers and are situated between the bearing axis (3) and the roller axes (2), that a flange (8) is provided at one end of the cage in connection to one of said annular portions (4) and extending radially outward, the flange having a side surface intended for contacting the adjacent end surfaces of the rollers situated in the cage, and a number of protrusions (9) extending towards the pockets of the cage and having surfaces facing the pockets.*

*7. A cage for a row of rollers (1) in a roller bearing in which the axes (2) of the rollers define a cone, which cage comprises two closed annular portions (4, 5) and a number of bars (6) extending between said portions, the bars defining roller pockets (7), characterized in that the cage bars (6) extend substantially parallel to the axes of adjacent rollers and are situated between the bearing axis (3) and the roller axes (2), that a flange (8) is provided at one end of the cage in connection to one of said annular portions (4) and extending radially outward, the flange having a side surface intended for contacting the adjacent end surfaces of the rollers situated in the cage, and a number of protrusions (9) extending towards the pockets of the cage and having surfaces facing the pockets and successively increasing their distance from the flange surface in the direction towards the bearing axis are arranged on the flange (8) so as to face the middle of each pocket (7), respectively.*

*8. A cage for a row of rollers (1) in a roller bearing in which the axes (2) of the rollers define a cone, which cage comprises two closed annular portions (4, 5) and a number of bars (6) extending between said portions, the bars defining roller pockets (7), characterized in that the cage bars (6) extend substantially parallel to the axes of adjacent rollers and are situated between the bearing axis (3) and the roller axes (2), that a flange (8) is provided at one end of the cage in connection to one of said annular portions (4) and extending radially outward, the flange having a side surface intended for contacting the adjacent end surfaces of the rollers situated in the cage, and a number of protrusions (9) extending towards the pockets of the cage and having surfaces facing the pockets, and that the other one of said annular portions (5) is provided with a number of recesses (10) situated opposite the respective protrusions (9).*

* * * * *